May 6, 1941.    L. JURGILANIS    2,241,092
LAWN SPRINKLER
Filed May 5, 1939

Inventor:
Leo Jurgilanis
By
Attorneys

Patented May 6, 1941

2,241,092

UNITED STATES PATENT OFFICE 2,241,092

LAWN SPRINKLER

Leo Jurgilanis, Milwaukee, Wis.

Application May 5, 1939, Serial No. 271,981

1 Claim. (Cl. 299—57)

This invention appertains to lawn sprinklers, and has for one of its primary objects the provision of a device having a highly ornamental and pleasing appearance, and which will effectively water a large area of lawn.

Another salient object of my invention is to provide a lawn sprinkler in the form of an aquatic fowl, such as a duck, having a rotatable head and a laterally extending bill, the bill having formed on one side thereof rows of outlet openings for the water, whereby the water under pressure escaping through said opening will spin the head and, thus, bring about the watering of a large part of lawn surface.

A further important object of my invention is the provision of a lawn sprinkler in the form of a duck or the like having a body provided with a flat bottom lawn-engaging surface, the body being hollow and being adapted to be filled with water from a supply hose, the head, likewise, being hollow and communicating with the body, the water in the body adding sufficient weight to the appliance, whereby the appliance can be readily dragged over a lawn from place to place without tipping.

A further important object of my invention is the provision of novel means for associating the head with the body, whereby to insure an adequate supply of water to the head without danger of the head being accidentally displaced from the body.

A still further object of my invention is to provide a lawn sprinkler of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1:
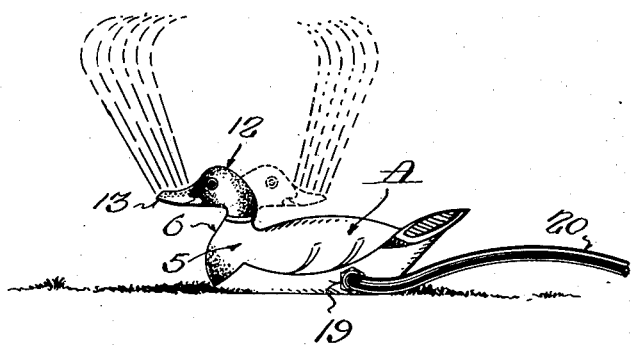
Figure 1 is a side elevational view of one form of my novel lawn sprinkler, showing the same in use.
Figure 2:
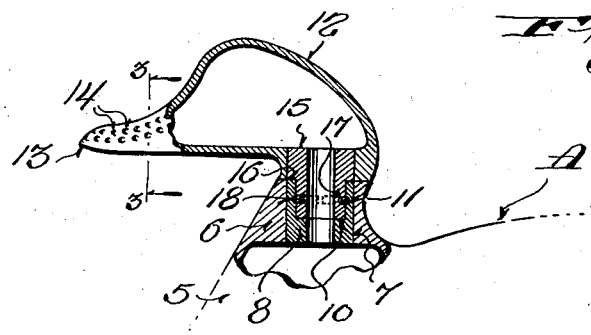
Figure 2 is an enlarged, fragmentary view, partly in section, illustrating the construction of the head and the means of associating the head with the body.
Figure 3:
Figure 3 is an enlarged, detail, transverse, sectional view through the bill of the lawn sprinkler.

Referring to the drawing in detail, wherein similar reference characters designate corresponding parts throughout the several views, the letter A generally indicates my novel appliance, which is constructed to resemble, preferably, an aquatic fowl. In the present showing, the lawn sprinkler has been formed to simulate a duck, but it is to be understood that the device can be formed to have the appearance of a swan, a goose, or any other desired form of fowl or bird.

In accordance with my invention, the appliance A comprises an elongated body 5 having an upwardly extending neck 6 on one end thereof. This neck 6 has formed therein a vertically extending bore 7, and this bore can have secured therein, against accidental movement, a bearing sleeve 8. The bearing sleeve 8, intermediate its ends, is shouldered, as at 10, and the interior of the sleeve above the shoulder 10 has formed therein an annular groove 11.

The head 12 of the lawn sprinkler is formed hollow and has formed thereon the radially or outwardly extending hollow bill 13. This bill, on one side thereof, has formed therein one or more rows of water outlet openings 14. Secured to the hollow head 12 is a depending bearing nipple 15, and this nipple, intermediate its ends, is shouldered, as at 16, for engaging the outer surface of the neck 6 of the body and the upper edge of the bearing sleeve 8. The portion of the bearing nipple below the shoulder 16 has formed therein a relatively deep annular groove 17 for the reception of an expansion resilient split ring 18.

By this arrangement and formation of parts, the expansion resilient split ring can be compressed and confined within its groove 17, after which the reduced portion of the bearing nipple 15 can be slipped into the sleeve 8 until the ring reaches the annular groove 11 formed in the bearing sleeve, at which time the ring will expand and partially snap into said groove 11, and, thus, hold the head against accidental separation from the body.

This connection forms an easy means for permitting the quick association of the head with the body, and one which will allow the free rotation of the head without the accidental displacement of the head from the body.

While I have shown the bearing sleeve 8 and the nipple 15 formed separate from the body and head, and rigidly connected thereto, it is to be understood that these parts can be formed integral with their respective members.

The body 5 is hollow and can be formed from any desired material, such as brass, copper, or the like, and the body carries an outwardly extending hose connection 19 for permitting the detachable securing thereto of a garden hose 20.

The lower surface of the body 5 is formed with a large flat bottom wall, so that the duck, goose, swan, or the like will rest in such a manner on the lawn as to simulate a duck, goose, or swan resting in a body of water, and this flat bottom prevents the accidental tilting of the sprinkler.

It is also preferred to have the body 5 hollow so that the body will be filled with water when the device is in use, and this water will add the necessary and desirable weight to the body, so that the body can be dragged by the hose to new and different positions without the accidental tilting of the body. However, if desired, a tube can connect the hose connection 19 with the bearing sleeve 8.

In use of my improved lawn sprinkler, the water flowing from the hose 20 will circulate in the head 12, and this water under pressure will escape through the rows of openings 14. As the bill is off-center relative to the bearing sleeve and nipple, the water flowing out of the bill will spin the head, and, thus, the lawn will be sprinkled entirely around the duck.

From the foregoing description it can be seen that I have provided an ornamental lawn sprinkler, which will effectively accomplish the desired work.

Changes in details may be made without departing from the spirit or the scope of my invention, but what I claim as new is:

A lawn sprinkler comprising, an elongated hollow body having a flat lower surface formed directly thereon for resting on the ground, said body being adapted to be filled with water, whereby the weight of the water and the body will hold the sprinkler firmly on the ground, a hose connection carried by the body, an upwardly extending neck formed on one end of the body and communicating therewith, a hollow head rotatably mounted on the neck, a laterally disposed hollow extension formed on the head and communicating therewith and eccentrically disposed relative to the vertical axis of the neck, said hollow extension having formed an one side thereof only a plurality of rows of water escape openings.

LEO JURGILANIS.